United States Patent Office

3,554,779
Patented Jan. 12, 1971

---

3,554,779
TRANSFER COMPOSITIONS
Donald Firth, Skelmanthorpe, near Huddersfield, England, assignor to Datacopy Limited, Park Mill, Clayton West, near Huddersfield, Yorkshire, England, a British company
No Drawing. Filed Oct. 25, 1967, Ser. No. 677,865
Claims priority, application Great Britain, Oct. 26, 1966, 48,082/66; Oct. 5, 1967, 45,520/67
Int. Cl. B41m 5/10
U.S. Cl. 117—36.3          17 Claims

ABSTRACT OF THE DISCLOSURE

The present invention relates to a transfer sheet system in which a sheet support is provided with a coating of a transfer composition on one side and a coating of a receptor composition on the other, the transfer composition comprising a binder including a resin soluble in a spirit and a transferrable colouring material including a colouring pigment which is insoluble in said spirit, and the receptor composition comprising a thermoplastic polyalkylene, such as polyethylene together with an alkyl cellulose and/or alkyl hydroxyalkyl cellulose binder, the arrangement being such that on placing a layer of transfer composition adjacent a layer of the receptor composition, the application of pressure, as with a typewriter key, to bring said layers into pressure contact results in the transfer of colouring material from the layer of the transfer composition to the layer of receptor composition. The alkyl cellulose and/or alkyl hydroxyalkyl cellulose are preferably ethyl cellulose and ethyl hydroxyethyl cellulose respectively.

---

The present invention relates to transfer sheets.

Hitherto, it has been known to provide transfer sheets having a transfer layer comprising a pressure sensitive pigment, usually black, so that on application of pressure to a surface of the sheet, as for instance under the pressure of a typewriter key, an image of the impress is transferred to a surface in contact with the transfer layer.

While these transfer sheets are perfectly satisfactory for producing copies, as for instance carbon copies of typescript, they suffer from the disadvantage that when such a transfer sheet is inadvertently subjected to an impression as with a ballpoint pen, an image is transferred from the transfer sheet to the surface in contact with said transfer surface.

According to the present invention, there is provided a transfer system including a transfer composition and a receptor composition wherein the transfer composition comprises a binder including a resin soluble in a spirit, and a transferable colouring material including a colouring pigment which is insoluble in said spirit and wherein the receptor composition comprises a thermoplastic polyalkylene together with an alkyl cellulose and/or an alkyl hydroxyalkyl cellulose binder, the arrangement being such that with the layer of the transfer composition adjacent a layer of the receptor composition the application of pressure, e.g., as with a typewriter key, to one of said layers to bring the layers into pressure contact, results in the transfer of colouring material from the layer of transfer composition to the layer of receptor composition.

The present invention also provides a transfer sheet system comprising a first sheet carrying a layer of a transfer composition and a second sheet carrying a layer of a receptor composition, wherein the transfer composition comprises a binder including a resin soluble in a spirit and a transferable colouring material including a colouring pigment which is insoluble in said spirit and wherein the receptor composition comprises a thermoplastic polyalykylene together with an alkyl cellulose and/or alkyl hydroxyalkyl cellulose binder, the arrangement being such that with the first sheet arranged adjacent the second sheet so that the layers carried on each sheet are in contact, the application of pressure, e.g., by a typewriter key, to one of said sheets results in pressure contact between the layers and the transfer of colouring material from the transfer composition of the first sheet to the receptor composition on the second sheet.

The resin of the transfer composition may be a modified rosin esterified pentaerythritol, for example, the resin commercially available under the trade name Bedesol 76 which is a rosin-maleic adduct esterified with pentaerythritol or with glycerol, for example the resin commercially available under the trade name "Crayvallac 502" which is a rosin-maleic adduct esterified with glycerol. In the former case, the ethyl cellulose or ethyl hydroxyethyl cellulose included in the transfer composition acts as a plasticising agent to prevent the coating from becoming brittle and breaking on folding a sheet to which the composition may be applied. In the latter case, the alkyl cellulose or alkyl hydroxyethyl cellulose acts as a binding agent since the "Crayvallac 502" alone has insufficient binding power.

A suitable plasticiser for the transfer and the receptor compositions comprise the plasticisers available under the trade names "Howflex SB," "Howflex CS," "Howflex Dap," and "Howflex SA." All of the Howflex plasticisers are available from Howards of Ilford. "Howflex Dap" is a phthalate ester of mixed aliphatic alcohol containing from 7 to 9 carbon atoms. It is preferred to mix this plasticiser with "Howflex CS" which is cyclohexanol stearate. "Howflex SA" is a mixture of isomeric dimethyl cyclohexyl adipates and "Howflex SB" is a mixture of isomeric dimethyl cyclohexyl sebacates. Proportions of additives such as the "Glokem E-2-0" and "Glokem E-2-S" these being waxlike long chain amides may be included in both the transfer and the receptor compositions.

The pigment used in the transfer composition may be a dark grey, a dark blue, or a monastral blue, typical pigments being Dark Grey M5466, Dark Blue DC1325 and ED1 Monastral BX, all available from I.C.I. Limited.

The transfer composition may also incorporate a proportion of a polyvinyl pyrrolidone such as that commercially available under the trade name "Albigen A" as a stripping agent. A proportion of an antioxidant may also be included in the transfer composition, a typical antioxidant being that commercially available under the trade name "Annulex BHT." The transfer composition may further include an organic compound having at least one functional group containing a lone electron pair, a typical example of such an organic compound, is benzequinone.

A typical transfer composition may be prepared by mixing 1 to 2 parts by weight of a spirit soluble resin with 2 to 5 parts by weight of pigment. The mixture so formed is then dispersed in its own weight of spirit such as white spirit in which the resin is soluble.

The polyalkylene of the binder of the receptor composition is preferably polyethylene and the alkyl cellulose and alkyl hydroxyalkyl cellulose included in the receptor composition may be ethyl cellulose and ethyl hydroxyethyl cellulose respectivey. It is preferred that the thermoplastic polyalkylene has a softening point within the range 80° C. to 300° C. but preferably a softening point not less than 100° C. Both the receptor compositions and the transfer compositions may include a proportion of a filler such for example as an opacifying agent, e.g., titanium dioxide commercially available under the trade name "Tioxide A-HR" a finely divided china clay or a finely divided silica such for example as that available under the trade name "Gasil 23."

The receptor composition may typically comprise 2.5 to 3.5 parts by weight of binder comprising a mixture of thermoplastic polyethylene and ethyl hydroxyethyl cellulose or ethyl cellulose, 2.5 parts by weight of filler and 1.2 parts by weight of plasticiser. The binder of the receptor composition may also include a proportion of polyterpenes.

Each of the compositions may be applied to a backing sheet by dispersing each composition in at least its own weight of spirit which acts as solvent for the resin and there after coating the backing sheet and permitting the spirit to evaporate to leave a coating of the receptor and/or transfer composition on the sheet. A backing sheet may be provided with a coating of a transfer composition on one side thereof and a coating of the receptor composition on the other. Typical solvents are selected from the lower aliphatic alcohols such for example as isopropyl alcohol and ethanol. The backing sheet may be paper, a textile fabric such as cotton, silk, rayon or polyethylene terephthalate, a regenerated cellulose, a cellulose ester sheet, a polyvinyl chloride, a polyvinylidene chloride and/or polyvinyl chloride acetate polymers. Either or both of the compositions may include a small proportion of perfume to ensure a masking of any objectionable smell.

Following is a description by way of example of transfer sheets and compositions in accordance with the present invention.

EXAMPLE 1

A transfer composition was made up as follows:

White spirit—8 litres
Bedesol 76 Resin (I.C.I. Ltd.)—950 g.
Ethyl hydroxyethyl cellulose—500 g.
Howflex SA plasticiser (Howards of Ilford Ltd.)—200 ml.
Tioxide A-HR (British Titan Products Ltd.)—2,500 g.
Gasil 23—400 g.
Vulcan 3F Carbon Black—175 g.
Dark grey pigment—2,100 g.
Glokem E-20—1,000 g.
Albigen "A"—500 ml.
Antioxidant—Annulex BHT—90 g.
Deodorant—75 ml.

The components of the transfer composition were dispersed in the white spirit and the composition was applied by known coating techniques to a sheet of paper. The white spirit in the coating was allowed to evaporate and it was found that the satisfactory layer of transfer composition of pale grey in colour was disposed on the surface of the sheet.

EXAMPLE 2

A transfer composition was made up as follows:

Isopropyl alcohol solvent—9 litres
Bedesol 76 Resin—2,100 g.
Ethyl hydroxyethyl cellulose (low viscosity grade)—500 g.
Howflex SA—250 ml.
Tioxide A-HR—2,500 g.
Dark Blue DC 1325—2,000 g.
Ed1 Monastral BX manufactured by I.C.I. Ltd.—500 g.
Gasil 23—750 g.
Albigen "A"—500 ml.
Glokem E-2-O—1,750 g.
Annulex BHT—90 g.

This transfer composition was applied to a backing sheet in the manner described with respect to Example 1.

EXAMPLE 3

A grey transfer layer was prepared as follows:

Isopropanol solvent—12 litres
Bedesol 76—1,000 g.
Ethyl hydroxyethyl cellulose (low viscosity grade)—500 g.
Howflex SA—250 ml.
Tioxide A-HR—2,500 g.
Vulcan 3F—400 g.
Dark Grey M5466—2,100 g.
Gasil 23—750 g.
Albigen "A"—500 ml.
Glokem E-2-O—2,700 g.
Annulex BHT—90 g.

The above transfer composition was mixed and dispersed in its solvent and applied to a paper backing sheet in the manner described in Example 1 above.

EXAMPLE 4

A receptor composition was made up as follows:

White spirit—12 litres
Polyethylene 629—3,500 g.
Ethyl hydroxyethyl cellulose—250 g.
Glokem E-2-O plasticiser—800 g.
Glokem E-2-S plasticiser—400 g.
Tioxide A-HR (British Titan Products Ltd.)—1,050 g.
China clay—300 g.

The components of the receptor composition were mixed and dispersed in the white spirit and the receptor composition was applied to a backing sheet of paper.

EXAMPLE 5

A receptor composition was made up as follows:

White spirit—13 litres
Polyethylene 629—3,500 g.
Ethyl hydroxyethyl cellulose (low viscosity grade)—400 g.
Glokem E-2-S—3,000 g.
Glokem E-2-O—1,000 g.
Tioxide A-HR—1,500 g.

This receptor composition was dispersed in its solvent and was applied to a backing sheet of paper in the manner described with respect to the transfer composition of Example 1.

It was found that on placing a transfer sheet carrying a layer of transfer composition adjacent the layer of receptor composition on a second sheet of paper the application of an impression to the uncoated surface of the transfer sheet served to bring the transfer and receptor layers into pressure contact to result in the transfer of a substantially quantity of colouring material from the transfer sheet to the receptor sheet. Each of the transfer compositions of Examples 1 to 3 can be used with each of the receptor layers of Examples 4 and 5.

What is claimed is:

1. A transfer sheet system comprising a first sheet carrying a layer of a transfer composition and a second sheet carrying a layer of a receptor composition, wherein the transfer composition comprises a binder including a spirit-soluble resin consisting of a resin esterified with a compound selected from the group consisting of pentaerythritol and glycerol and a transferable colouring material including a spirit-insoluble pigment and wherein the receptor composition comprises a thermoplastic polyalkylene together with a binder selected from the group consisting of alkyl celluloses and alkyl hydroxyalkyl celluloses.

2. A transfer sheet system as claimed in claim 1 wherein the thermoplastic polyalkylene has a softening point within the range 80° to 300° C.

3. A transfer sheet system as claimed in claim 2 wherein the polyalkylene of the binder in the receptor composition is polyethylene.

4. A transfer sheet system as claimed in claim 1 wherein the binder of the receptor composition is selected from the group consisting of ethyl cellulose and ethyl hydroxyethyl cellulose.

5. A transfer sheet system as claimed in claim 1 wherein the transfer composition includes a proportion of a plasticiser selected from the group consisting of phthalate esters of mixed alcohols containing 7 to 9 carbon atoms, mixtures of isomeric dimethyl cyclohexyl adipates, and mixtures of isomeric dimethyl cyclohexyl sebacates.

6. A transfer sheet system as claimed in claim 1 wherein the receptor composition includes a proportion of a plasticiser selected from the group consisting of phthalate esters of mixed alcohols containing 7 to 9 carbon atoms, mixtures of isomeric dimethyl cyclohexyl adipates and mixtures of isomeric dimethyl cyclohexyl sebacates.

7. A transfer sheet system as claimed in claim 1 wherein the receptor composition includes a proportion of a long chain amide.

8. A transfer sheet system as claimed in claim 1 wherein the transfer composition includes a proportion of a long chain amide.

9. A transfer sheet system as claimed in claim 1 wherein the receptor composition comprises 2.5 to 3.5 parts by weight of binder comprising a mixture of thermoplastic polyalkylene and member selected from the group consisting of ethyl hydroxyethyl cellulose and ethyl cellulose, 2.5 parts by weight of filler and 1.2 parts by weight of plasticiser.

10. A transfer sheet system as claimed in claim 1 wherein the binder of the receptor composition also includes a proportion of polyterpenes.

11. The transfer sheet system according to claim 1 in which the spirit-soluble resin is a rosin-maleic adduct.

12. The transfer sheet system according to claim 1 in which the transfer composition includes an alkyl cellulose or alkyl hydroxyalkyl cellulose.

13. A system as claimed in claim 1 wherein the pigment is selected from dark grey, dark blue or monoastral blue.

14. A system as claimed in claim 1 wherein the transfer composition includes a proportion of polyvinyl pyrrolidene.

15. A system as claimed in claim 1 wherein the transfer composition includes a proportion of an antioxidant.

16. A system as claimed in claim 1 wherein the transfer composition includes an organic compound having at least one functional group containing a lone electron pair, for example benzoquinone.

17. A system as claimed in claim 1 wherein the backing sheet is selected from paper, cotton, silk, rayon, nylon, polyethylene terephthalate, regenerated cellulose, cellulose ester, polyvinyl chloride, polyvinylidene chloride and polyvinyl chloride acetate copolymers.

References Cited

UNITED STATES PATENTS

| | | | |
|---|---|---|---|
| 3,169,880 | 2/1965 | Strauss | 117—36.3 |
| 3,203,832 | 8/1965 | Mino et al. | 117—36.3 |
| 3,226,134 | 12/1965 | Breidthardt | 117—36.3 |
| 3,340,086 | 9/1967 | Groak | 117—36.4 |
| 3,410,711 | 11/1968 | Hoge | 117—36.3 |

FOREIGN PATENTS

| | | | |
|---|---|---|---|
| 951,645 | 3/1964 | Great Britain | 117—36.4 |

MURRAY KATZ, Primary Examiner

U.S. Cl. X.R.

117—138.8; 155